(No Model.)
T. A. EDISON.
DYNAMO OR MAGNETO ELECTRIC MACHINE.
No. 287,523. Patented Oct. 30, 1883.
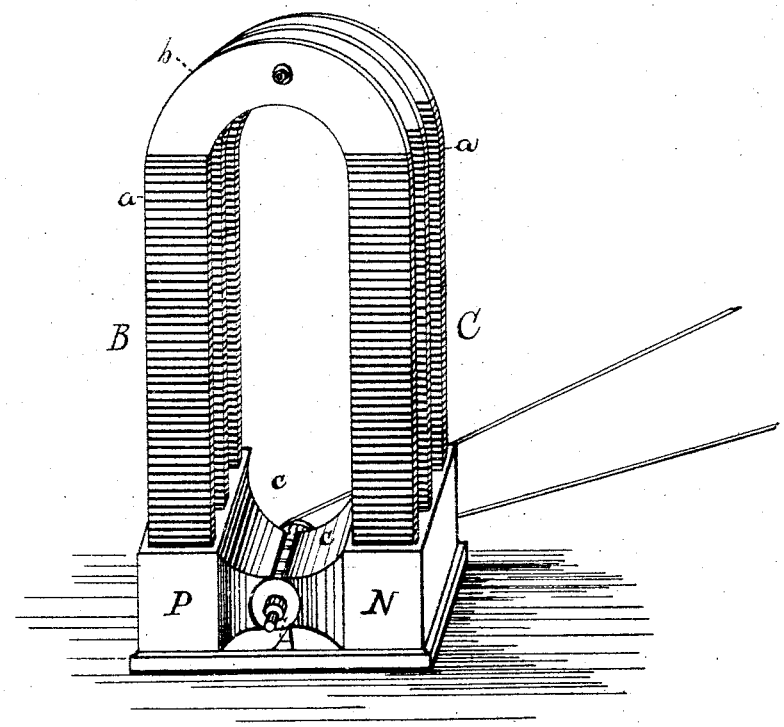
WITNESSES:
E. C. Rowland
[signature]
INVENTOR:
Thomas A. Edison,
BY Rich'd N. Dyer.
ATTORNEY.

UNITED STATES PATENT OFFICE.

THOMAS A. EDISON, OF MENLO PARK, NEW JERSEY, ASSIGNOR TO THE EDISON ELECTRIC LIGHT COMPANY, OF NEW YORK, N. Y.

DYNAMO OR MAGNETO ELECTRIC MACHINE.

SPECIFICATION forming part of Letters Patent No. 287,523, dated October 30, 1883.

Application filed September 13, 1882. (No model.)

*To all whom it may concern:*

Be it known that I, THOMAS A. EDISON, of Menlo Park, in the county of Middlesex and State of New Jersey, have invented a new and useful Improvement in Dynamo or Magneto Electric Machines, (Case No. 436;) and I do hereby declare that the following is a full and exact description of the same, reference being had to the accompanying drawing, and to the letters of reference marked thereon.

The object I have in view is to produce a more efficient construction of the field-of-force electro-magnet of dynamo or magneto electric machines, so that greater magnetic force can be produced than heretofore with the same mass of iron and with the same consumption of electrical energy. This I accomplish by employing, in connection with the polar extensions of a machine, two or more pairs of flat or plate magnet-cores made of soft iron and wound separately with insulated wire, through which the electric current passes. Each pair of flat soft-iron cores is preferably made in one piece, with a connecting back piece or yoke; but the back piece or yoke may be a separate piece secured to the flat cores. The pairs of flat cores being separately wound, they may be connected in series in the field-circuit in multiple arc or in multiple series. This construction of the field-of-force electro-magnet gives greater magnetic strength than the round cores wound separately, or cores made up of a number of flat plates covered with a common winding. In connection with this construction of the cores, to give still greater efficiency, the concentrating convergent polar extensions may be used.

The foregoing will be better understood from the drawing, which shows in perspective a machine embodying the invention.

A is the revolving armature, having a continuous bobbin connected with the bars of a commutator-cylinder, and being preferably itself of cylindrical form, and P N are the polar extensions of the field electro-magnet. These polar extensions have attached to them two or more pairs of flat soft-iron cores, B C, which are separately wound with insulated wire, as shown at *a*, forming part of the field-circuit. The yoke *b*, connecting each pair of flat soft-iron cores, is preferably made in one piece with the cores. The magnet-cores may be arranged in a vertical or in a horizontal position, and be attached to one side only of the polar extensions, or to opposite sides of the same.

To obtain greater efficiency, the polar extensions P N are constructed with bevel surfaces *c*, so as to contract the field-of-force vertically or horizontally, or in both directions. Machines constructed in this way have corresponding advantages when used as electric engines or motors.

I do not claim herein the convergent pole-pieces, or the pole-pieces forming a cylindrical space in which the armature revolves, or the polar extensions, each made in one piece and provided with two or more cores, these inventions being claimed in my application No. 71,756; and it is to be understood that all other patentable features of invention shown or described, but not claimed herein, are reserved for protection by other patents, and have been or will be embodied in other applications for patents.

What I claim is—

1. In a dynamo or magneto electric machine, the field-of-force electro-magnet having two or more pairs of flat soft-iron cores provided with separate windings and two polar extensions, to which all of such cores are attached, substantially as set forth.

2. In a dynamo or magneto electric machine, the field-of-force electro-magnet composed of two polar extensions and two or more pairs of flat soft-iron cores having separate windings and magnetically-separate yokes or back pieces, substantially as set forth.

3. In a dynamo or magneto electric machine, the field-of-force electro-magnet having two polar extensions and two or more pairs of flat soft-iron cores provided with separate windings and yokes made integral with the cores, substantially as set forth.

4. In a dynamo or magneto electric machine, the combination, with the armature, of the convergent polar extensions, the flat soft-iron magnet-cores provided with separate windings and two polar extensions, to which said cores are attached, substantially as set forth.

This specification signed and witnessed this 3d day of June, 1882.

THOS. A. EDISON.

Witnesses:
RICHD. N. DYER,
H. W. SEELY.